United States Patent
Hughes et al.

(10) Patent No.: US 8,195,887 B2
(45) Date of Patent: Jun. 5, 2012

(54) PROCESSOR POWER MANAGEMENT AND METHOD

(75) Inventors: William A. Hughes, San Jose, CA (US); Kiran K. Bondalapati, Los Altos, CA (US); Vydhyanathan Kalyanasundharam, San Jose, CA (US); Kevin M. Lepak, Austin, TX (US); Benjamin T. Sander, Austin, TX (US)

(73) Assignee: GlobalFoundries Inc.

( * ) Notice: Subject to any disclaimer, the term of this patent is extended or adjusted under 35 U.S.C. 154(b) by 650 days.

(21) Appl. No.: 12/356,624

(22) Filed: Jan. 21, 2009

(65) Prior Publication Data

US 2010/0185820 A1      Jul. 22, 2010

(51) Int. Cl.
  *G06F 12/08*  (2006.01)
  *G06F 1/32*   (2006.01)
(52) U.S. Cl. .......................... 711/135; 713/323
(58) Field of Classification Search .......... None
  See application file for complete search history.

(56) References Cited

U.S. PATENT DOCUMENTS

| | | | |
|---|---|---|---|
| 5,931,951 A | 8/1999 | Ando | |
| 6,085,330 A | 7/2000 | Hewitt et al. | |
| 6,125,450 A * | 9/2000 | Kardach | 713/323 |
| 2003/0201838 A1* | 10/2003 | Tam et al. | 331/74 |
| 2005/0028015 A1* | 2/2005 | Asano et al. | 713/320 |
| 2006/0174142 A1* | 8/2006 | Lin et al. | 713/300 |
| 2006/0200690 A1 | 9/2006 | Cline et al. | |
| 2008/0077813 A1* | 3/2008 | Keller et al. | 713/320 |
| 2009/0158067 A1* | 6/2009 | Bodas et al. | 713/323 |

OTHER PUBLICATIONS

International Search Report for PCT/US2010/021555 dated Apr. 23, 2010, 4 pages.

* cited by examiner

*Primary Examiner* — Kaushikkumar Patel

(57) ABSTRACT

A data processing device is disclosed that includes multiple processing cores, where each core is associated with a corresponding cache. When a processing core is placed into a first sleep mode, the data processing device initiates a first phase. If any cache probes are received at the processing core during the first phase, the cache probes are serviced. At the end of the first phase, the cache corresponding to the processing core is flushed, and subsequent cache probes are not serviced at the cache. Because it does not service the subsequent cache probes, the processing core can therefore enter another sleep mode, allowing the data processing device to conserve additional power.

17 Claims, 2 Drawing Sheets

PROCESSOR POWER MANAGEMENT AND METHOD

BACKGROUND

1. Field of the Disclosure

The present disclosure relates generally to electronic devices, and more particularly to data processing devices.

2. Description of the Related Art

Data processing devices can include multiple processor cores to increase computational performance. In some data processing devices, each processor core can be placed in any of a number of low-power states, referred to as sleep modes. In a sleep mode, a processor core typically does not perform normal operations or performs operations at reduced speed compared to a normal mode of operation of the processor core. Accordingly, power consumption of the data processing device can be reduced by placing a processor core in a sleep mode, but this can reduce the processing efficiency of the device. Further, frequent transitions to and from a sleep mode can be inefficient due to the cost of time and power to bring the processor core to the normal mode, or due to the loss of information stored a the processor core.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A data processing device is disclosed that includes multiple processing cores, where each core is associated with a corresponding cache. When a processing core is placed into a first sleep mode, the data processing device initiates a first phase. If any cache probes are received at the processing core during the first phase, the cache probes are serviced. At the end of the first phase, the cache corresponding to the processing core is flushed, and subsequent cache probes are not serviced at the cache. Because it does not service the subsequent cache probes, the processing core can therefore enter another sleep mode, allowing the data processing device to conserve additional power.

Figure 1:
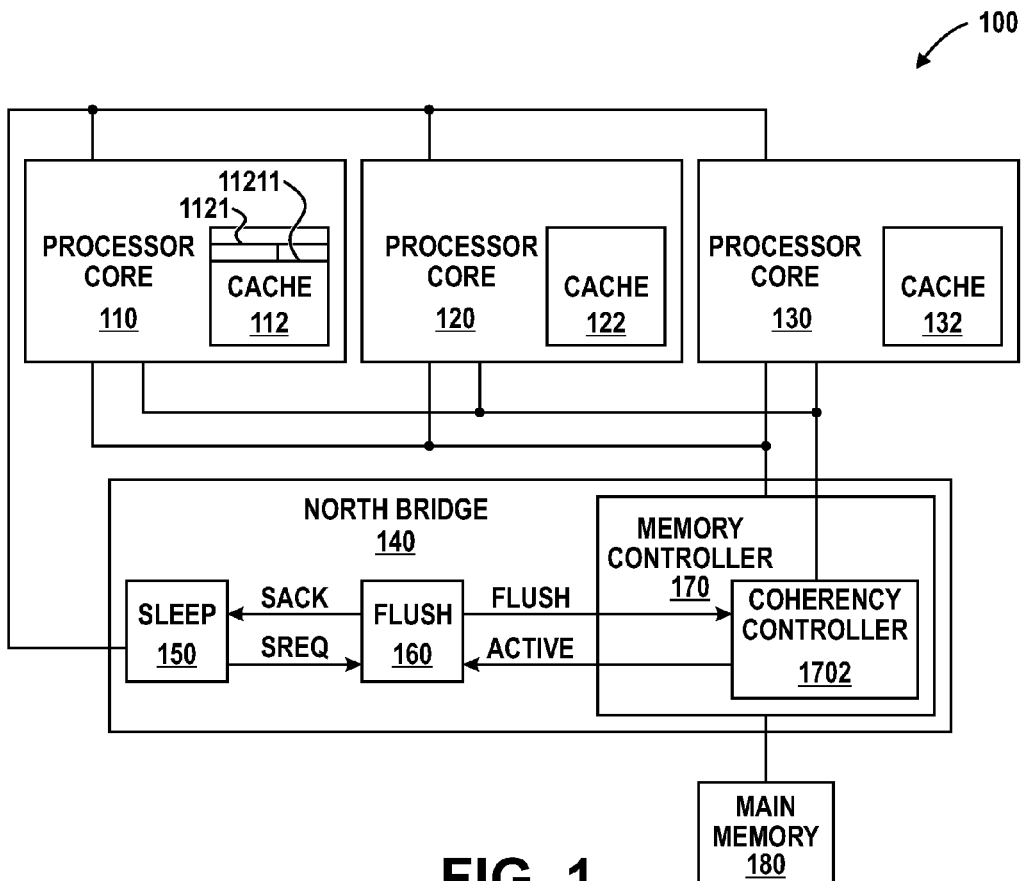
FIG. 1 is a block diagram illustrating a data processing device in accordance with a specific embodiment of the present disclosure.

FIG. 1 is a block diagram illustrating a data processing device 100 in accordance with a specific embodiment of the present disclosure. Data processing device 100 includes processor cores 110, 120, and 130, a northbridge 140, and a main memory 180. Processor core 110 further includes a cache memory 112, processor core 120 includes a cache memory 122, and processor core 130 includes a cache memory 132. Each of cache memories 112, 122 and 132 includes a plurality of cache lines and each cache line includes status information. Cache memory 112 is illustrated to include cache line 1121 and status information 11211. Northbridge 140 further includes a sleep module 150, a flush module 160 and a memory controller 170. Memory controller 170 further includes a coherency controller 1702.

Processor cores 110, 120 and 130 are each connected to memory controller 170, coherency controller 1702, and sleep module 150. Sleep module 150 has an output to provide a sleep request signal, labeled "SREQ," to flush module 160, and an input to receive a sleep acknowledgement signal, labeled "SACK," from flush module 160. Flush module 160 has another output to provide a signal, labeled "FLUSH," to coherency controller 1702, and another input to receive a signal, labeled "ACTIVE," from coherency controller 1702. Memory controller 170 is also connected to main memory 180.

Data processing device 100 is a multiprocessor device wherein processor cores 110, 120, and 130 share a single northbridge 140 and main memory 180. A processor core can perform computational tasks by executing instructions and manipulating data information based on the instructions. Data processing device 100 may include additional devices (not shown) such as a peripheral interface module, magnetic or optical mass information storage devices, virtual address translation modules, and the like. Such additional devices may or may not be incorporated in a common integrated circuit with the processor cores 110, 120, and 130. Cache memories 112, 122, and 132 can represent one or more data caches and instruction caches. The methods disclosed can be applied with respect to instruction or data cache memories, and no particular distinction is warranted.

Immediately after data processing device 100 is activated, such as by the application of power or the assertion of a reset signal, cache memories 112, 122, and 132 contain no information. Each of processor cores 110, 120, and 130 can begin requesting instructions and data information, and memory controller 170 of northbridge 140 supports these requests by issuing corresponding requests to main memory 180. As instructions and data are accessed from main memory 180, copies of the information accessed from main memory 180 can be stored at one or more of cache memories 112, 122, and 132.

Data processing device 100 includes main memory 180 that is shared by each of processor cores 110, 120, and 130. Main memory 180 stores instructions that describe how to perform a task. Each processor core can access these instructions from main memory 180, and can also access main memory 180 to store and retrieve data. Accessing main memory 180 can require a large number of clock cycles and is therefore relatively slow. Therefore, each of processor cores 110, 120, and 130 includes a cache memory, 112, 122, and 132 respectively, that can be accessed quicker than main memory 180. Cache memories 112, 122, and 132 are smaller and faster than main memory 180, and store copies of frequently used data or instructions located in main memory 180. Cache memories 112, 122, and 132 can also improve memory access efficiency by reducing contention for main memory access by multiple processor cores. A processor core may include an instruction cache memory to store instructions, a data cache memory to store data information. Furthermore, an instruction or data cache may be organized as multiple cache memories, referred to as cache levels.

Main memory 180 can represent dynamic, static, non-volatile, or another type of memory device. When any of processor cores 110, 120, or 130 needs to read from or write to a location in main memory 180, data processing device 100 first checks to see whether a copy of the information is located in the cache memory associated with the processor core, or a cache memory associated with another processor core. If the information is located in a cache memory, the instruction or data stored in the cache can be accessed considerably faster than accessing the same information from the main memory.

Each element of information stored in a cache is located at a respective cache line, and each cache line includes a data field that contains status information corresponding to the information element. The status information is used provide coherency between the cache memories and main memory 180. For example, cache memory 112 includes multiple cache lines, such as cache line 1121, and each cache line includes status information, such as status information 11211.

Northbridge 140 is a resource that is shared by each of processor cores 110, 123, and 130. Northbridge 140 may include other modules (not shown), such as a high-speed bus interface module, clock generators, peripheral control interface (PCI) registers, and the like. Illustrated northbridge modules include sleep module 150, flush module 160, and memory controller 170. Memory controller 180 provides access of processor cores 110, 120, and 130 to main memory 180. Sleep module 150 is responsible for transitioning a processor core into and back out of a sleep mode. Flush module 160 determines when a cache memory associated with a processor core should be flushed.

Memory controller 170 fulfills all instruction and data requests from processor cores 110, 120, and 130 by first seeking the desired information within cache memories 112, 122, and 132, and requesting the information from main memory 180 if the information is not available at a cache memory. If a valid copy of the desired information is contained at one of cache memories 112, 122, and 132, memory controller 180 access the information at that cache memory and forwards the information to the processor core that originally issued the request. Depending on the specific coherency protocol supported by data processing device 100, a copy of the requested information may be stored at that processor core's cache memory.

Coherency controller 1702 is configured to maintain consistency between information stored in the cache memories 112, 122, and 132, and the main memory 180. Because the information stored in a cache memory is shared between the individual processor cores, coherency protocols are observed that identify when information in a cache memory is no longer valid so that the invalid information is not inadvertently accessed. A specific copy of information may become invalid if another copy of the information stored in another cache memory or in main memory 180 has been more recently modified. The coherency protocol maintains consistency between information stored in cache memories 112, 122, and 132, and main memory 180 by maintaining status information associated with each cache line, such as status information 11211 of cache line 1121. An example of a cache coherency protocol is the MOESI protocol, where one of five possible states is encoded by the cache line status information: modified, owned, exclusive, shared, and invalid.

Coherency controller 1702 responds to memory access requests initiated by processor cores 110, 120, and 130 by broadcasting cache probes to each active cache memory. Each active cache memory can respond to the cache probe by identifying if the requested data is stored at the respective cache memory, and associated status information. Memory controller 170 fulfills the original memory access request with information provided by a cache memory, if available, or from main memory 180 if the information is not located in a cache memory.

For example, when processor core 110 needs to access information at a particular address in main memory 180, coherency controller 1702 broadcasts a cache probe to each of cache memories 112, 122, and 132. This is necessary even when the information appears to be present in the cache memory associated with the requesting processor core, because the information may have been subsequently modified by another processor core, and stored in another location. Each of cache memories 112, 122, and 132 can respond to the cache probe indicating if the requested information is present, and the status of that information. The act of responding to a cache probe can be referred to as servicing the cache probe. If memory controller 170 determines that a cache memory contains a valid copy of the requested information, memory controller 170 can access the information and provide it to the processor core that initially made the request. Each cache memory that does not contain the requested information responds to the cache probe with an indication referred to as a cache probe miss. If each of cache memories 112, 122, and 132 respond to the cache probe with an indication of a cache probe miss, memory controller 170 will access the requested information from main memory 180.

Sleep module 150 is configured to control transitioning of each of processor cores 110, 120, and 130 into and back out one of available sleep modes. Sleep module 150 can monitor the utilization of individual processor cores and can receive commands from an operating system to determine if power conservation measures are feasible. The operating system is responsible for scheduling tasks at specific processor cores or for distributing a task amongst multiple processor cores. The operating system can also be responsive to commands issued by a human operator.

Multiple sleep modes can be supported. For example, a light sleep mode may be characterized by a reduction in the operating frequency of the processor core by a factor of one-half, and moderately deeper sleep modes may include dividing the operating frequency by a greater amount, such as one-quarter or one-sixteenth. Deep sleep modes may be characterized by reducing the operating frequency of the processor core by a factor of 32, 512, or by completely stopping the processor clock. The frequency at which a processor core operates is determined by a clock signal. Sleep modes may also include a reduction in processor core operating voltage, or the complete removal of power.

In normal operation, valid information can be distributed amongst cache memories 112, 122, and 132, and the information can be provided to processor cores 110, 120, and 130 considerably faster than if all accesses were restricted to main memory 180. A dilemma can arise when it is desired to place a processor core into a sleep mode. If a processor core is to be transitioned into a deep sleep mode, or completely deactivated, an operation referred to as a cache flush is performed. A cache flush is a process wherein all information that is only contained in that particular cache memory is written back to main memory 180. As a result, information that was previous readily accessible from that cache memory, must now be obtained from main memory 180. Furthermore, when the processor core is subsequently awakened out of the sleep mode, computational performance can be significantly limited until its associated cache memory is once again populated with information. Until the cache memory is again populated, the processor core is consuming maximum power while providing diminished computational productivity. If the cache memory associated with a processor core that is in a sleep mode is not flushed, the core must be reactivated every time a cache probe is broadcast, and thus may spend little time actually in the sleep mode, and provide reduced power conservation Prior to transitioning a processor core into a sleep mode, sleep module 150 can first announce its intention to flush module 160 by asserting sleep request signal SREQ. Flush module can determine if and when the cache memory associated with the processor core that is being placed into a sleep mode should be flushed. When flush module 160 determines that the particular cache memory should be flushed, flush module 160 asserts signal FLUSH, which is a request that coherency controller 1702 perform the flush operation. Flush module 160 is also responsive to cache probe activity directed by coherency controller 1702, and indicated by signal ACTIVE. Flush module 160 can respond to a sleep request from sleep module 150 by asserting sleep acknowledge signal SACK. The operation of flush module 160 is described in greater detail with reference to FIGS. 2 and 3.

Figure 2:
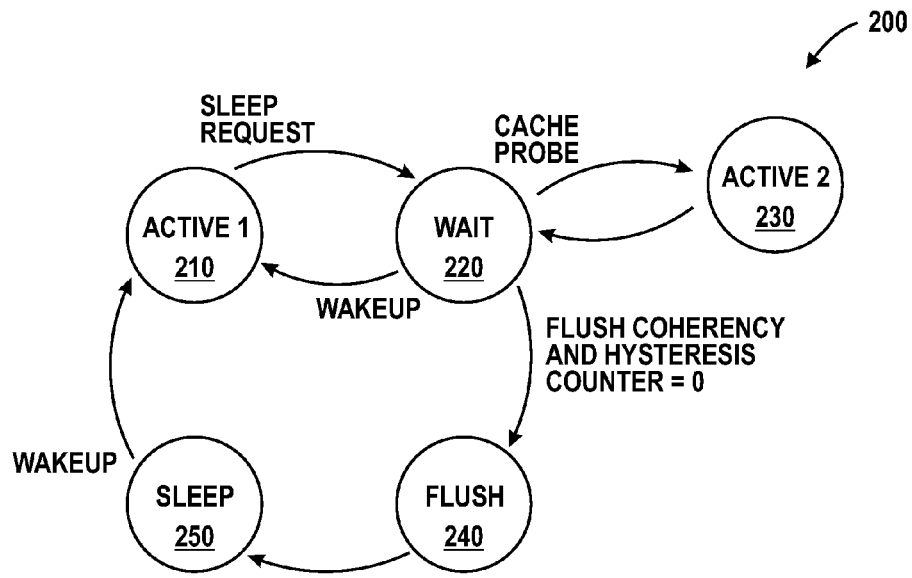
FIG. 2 includes a state diagram illustrating a method in accordance with a specific embodiment of the present disclosure.

FIG. 2 includes a state diagram 200 illustrating a method for transitioning a processor core into and back out of power conservation sleep modes in accordance with a specific embodiment of the present disclosure. For the purpose of discussion, the methods illustrated at state diagram 200 are described with reference to processor core 110 and associated cache memory 112 of FIG. 1. The state transitions illustrated are under the control of flush module 160 of FIG. 1. Generally, flush module 160 is configured to delay flushing the cache memory associated with a processor in response to a sleep request from sleep module 150, so that the cache memory associated with the processor core can continue to respond to cache probes for a period of time. Furthermore, situations where a processor core is requested to transition to a sleep mode, only to be soon thereafter reactivated, can be potentially avoided. A processor core can transition from one state to another in response to specific events. The time the processor core spends in a particular state, between entering that state and transitioning to another state, is sometimes referred to as a phase.

State element 210, labeled "ACTIVE1," represents a full-speed operating condition, or normal operating mode, of an active processor core. While in this state, the processor core is capable of executing instructions at the highest performance level at which it is capable of operating. The processor core can perform memory accesses and the desired instructions or data can be associated with a cache memory or main memory 180. Processor core 110, and cache memory 112 in particular, can respond to cache probes broadcast by coherency controller 1702, as previously described.

At a point in time, sleep module 150 can request that processor core 110 transition into state 220, labeled "WAIT." While in WAIT state 220, the operating frequency of processor core 110 can remain the same as in ACTIVE state 210, or can be reduced to a frequency associated with one of the available sleep modes. Upon entering WAIT state 220, a flush counter is initialized to a predetermined count value and can begin decrementing in response to a clock signal. The flush counter is used to indicate the passage of time. The duration of time can be determined by the initial count value, the frequency of the decrementing clock, and by a flush threshold value. Processor core 110 is prevented from transitioning to state 240, labeled "FLUSH," if the flush counter has not decremented from the initial count value to the flush threshold value.

Processor core 110 can be transitioned from WAIT state 220 back to ACTIVE1 state 210 by sleep module 150, or can be transitioned to state 230, labeled "ACTIVE2," in response to a cache probe. If processor core 110 receives a cache probe from coherency controller 1702, processor core 110 transitions to ACTIVE2 state 230, where it responds to the cache probe by indicating whether the requested information is present in cache memory 112, and the status of the information if the information is present. Once processor core 110 has responded to the cache probe, a second counter, referred to here as a hysteresis counter, previously initialized to a predetermined hysteresis threshold value, is reset to zero, and begins to increment based on a clock signal. Processor core 110 then returns to WAIT state 220. While in ACTIVE2 state 230, the flush counter can continue decrementing.

While processor core 110 is in ACTIVE2 state 230, it can remain in the same sleep mode as was configured while in WAIT state 220, transitioned into another sleep mode or it can be transitioned back to the full-performance mode. For example, processor core 110 can be configured to operate in a moderate sleep mode, such as one-thirty-second of the operating frequency of ACTIVE1 state 210 while in WAIT state 220, and returned to full operating frequency to respond to the cache probe while in ACTIVE2 state 230. Alternatively, processor core 110 can be configured to operate in a light sleep mode, such as one-quarter of the operating frequency of ACTIVE1 state 210 while in WAIT state 220, and remain at that operating frequency while responding to the cache probe in ACTIVE2 state 230.

In an embodiment, the flush counter can be configured to decrement only while processor core 110 is in WAIT state 220. In another embodiment, the flush counter can be configured to decrement only while processor core 110 is in ACTIVE2 state 230. In yet another embodiment, the flush counter can be configured to decrement while processor core 110 is in either WAIT state 220 or ACTIVE2 state 230.

Processor core 110 can transition to FLUSH state 240 once the flush counter has decremented to the flush threshold value, and the value at the hysteresis counter is equal to the original hysteresis threshold value. If processor core 110 has recently transitioned from ACTIVE2 state 230 back to WAIT state 220, then a transition to FLUSH state 240 cannot occur until the hysteresis counter has incremented back up to the hysteresis threshold value. The hysteresis counter prevents processor core 110 from immediately transitioning to FLUSH state 240 following a cache probe. Thus, processor core 110 can respond to additional cache probes for the duration of time configured by the hysteresis counter.

When processor core 110 enters FLUSH state 240, flush module 160 can assert signal FLUSH, and coherency controller 1702 can command processor core 110 to flush cache memory 112. As previously described, any information that is only valid in cache memory 112 is written back to main memory 180, and the status information of all cache lines of cache memory 112, such as status information 11211 of cache line 1121, are tagged as invalid. Once cache memory 112 has been flushed, processor core 110 can transition to state 250, labeled "SLEEP."

While processor core 110 is in SLEEP state 250, processor 110 can be transitioned into a deep sleep mode, and will no longer respond to cache probes broadcast by coherency controller 1702. In an embodiment, coherency controller 1702 can maintain a record of which cache memories have been flushed, and not expect those cache memories to respond to a cache probe broadcast. Instead, an indication of a cache probe miss can be generated within coherency controller 1702. At a subsequent time, sleep module 150 can transition processor core 110 back to ACTIVE1 state 210, where processor core 110 operates at full speed. Transitioning processor 110 from SLEEP state 250 to ACTIVE1 state 210 may require the restoration of power and clock signals to processor 110, which can take time. During this time, coherency controller 1702 can continue to respond to cache probes directed processor 110.

Figure 3:
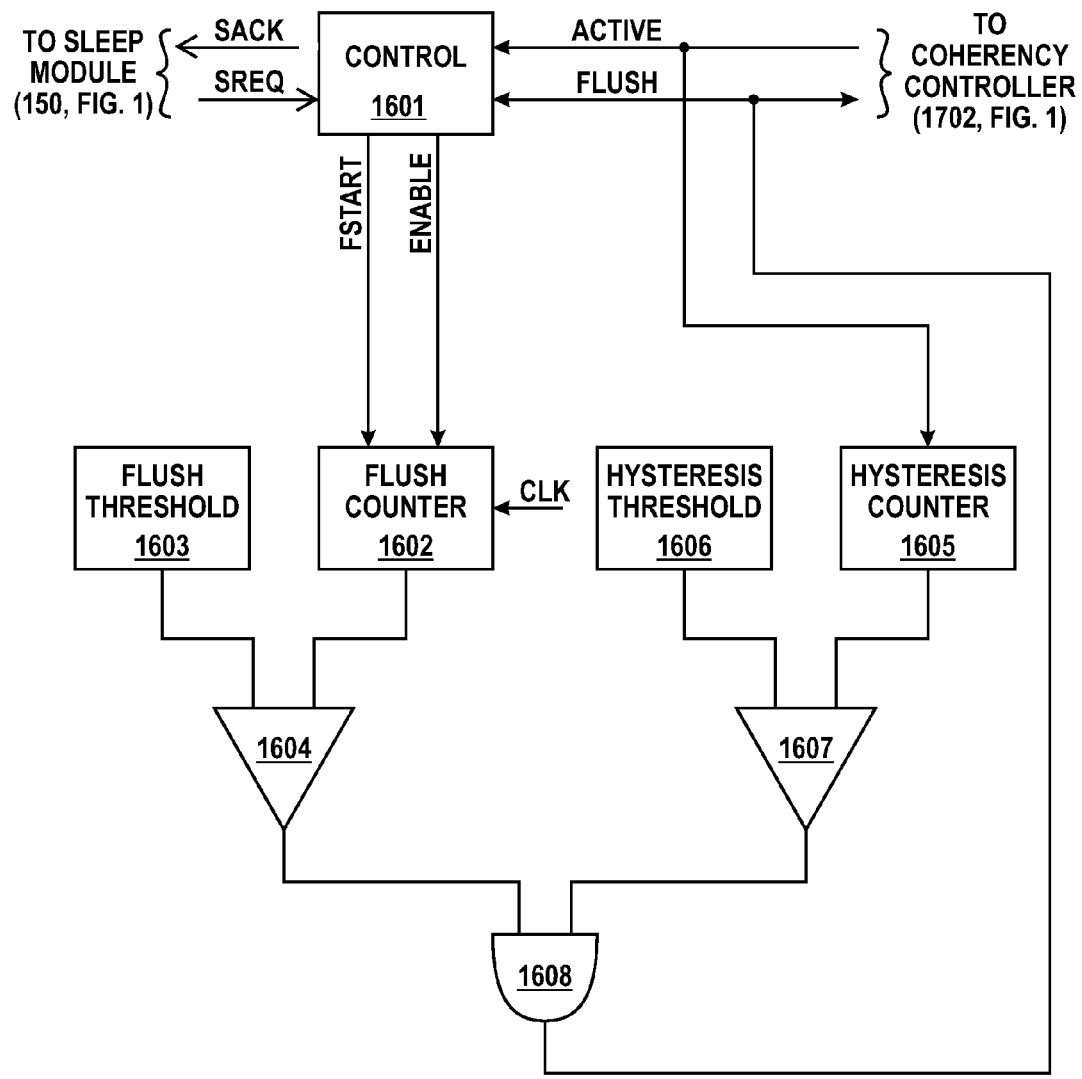
FIG. 3 illustrates, in partial block and partial schematic form, a flush control module of FIG. 1 in accordance with a specific embodiment of the present disclosure.

FIG. 3 illustrates, in partial block and partial schematic form, flush module 160 of FIG. 1 in accordance with a specific embodiment of the present disclosure. Flush module 160 is generally responsible for implementing the methods illustrated by state diagram 200. Flush module 160 includes a control module 1601, a flush counter 1602, a flush threshold register 1603, a comparator 1604, a hysteresis counter 1605, a hysteresis threshold register 1606, another comparator 1607, and an AND gate 1608.

Control module 1601 has an input to receive signal SREQ from sleep module 150, an output to provide signal SACK to sleep module 150, and an input to receive signal ACTIVE from coherency controller 1702. Control module 1601 has two additional outputs to provide signals, labeled "FSTART" and "ENABLE," to flush counter 1602. Flush counter 1602 has an input to receive a signal labeled "CLK." Comparator 1604 has an input connected to an output of flush counter 1602 and another input connected to an output of flush threshold register 1603. Hysteresis counter 1605 has an input to receive signal ACTIVE. Comparator 1607 has an input connected to an output of hysteresis counter 1605 and another input connected to an output of hysteresis threshold register 1606. AND gate 1608 has an input connected to the output of comparator 1604, another input connected to the output of comparator 1607, and an output to provide signal FLUSH to coherency controller 1702 and control module 1601.

As previously described, flush module 160 is generally responsible for administering the method illustrated at state diagram 200. The functionality illustrated at FIG. 3 is substantially replicated for each processor core included in data processing device 100. The operation of flush module 160 is once again described with reference to processor core 110. When processor core 110 is transitioned into WAIT state 220, signal FSTART is asserted which initializes flush counter 1602 to the predetermined flush count value, and signal ENABLE controls when flush counter 1602 is decremented. Flush counter 1602 is decremented in response to transitions of signal CLK, and thus provides periodic adjustment of the value present in flush counter 1602. When flush counter 1602 has decremented to a value equal to the value provided by flush threshold register 1603, the output of comparator 1604 is asserted. In an embodiment, the flush threshold register 1603 is a programmable register, so that the threshold provided by the register is a programmable value.

Hysteresis counter 1605 is initialized to the same value stored in hysteresis threshold register 1606 while processor core 110 is in ACTIVE1 state 210. In the event that processor core 110 receives a cache probe, hysteresis counter 1605 is reset to zero, and begins to increment back up to the initial hysteresis threshold value. The output of comparator 1607 is asserted when the value in hysteresis counter 1605 is the same as that provided by hysteresis threshold register 1606. This will be the case if no cache probe has been received, or if a sufficient period of time has elapsed following a cache probe for hysteresis counter 1605 to increment back up to the initial hysteresis count value. When the outputs of both of comparators 1604 and 1607 are asserted, signal FLUSH will be asserted by AND gate 1608. Signal FLUSH serves as a request to coherency controller 1702 to flush cache memory 112. Control module 1601 also responds to the assertion of signal FLUSH by asserting signal SACK, notifying sleep module 150 that processor 110 can be transitioned into SLEEP state 250 once the flushing of cache memory 112 is complete.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, data processing device 100, as illustrated, is a single processing node that includes a single northbridge and three processor cores, but the disclosed methods can be applied to data processing devices that include another number of nodes and processor cores. In addition, while some counters have been described as incrementing or decrementing, it will be appreciated that in other embodiments the counters could be adjusted in other ways.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   in response to determining a first data processor device has entered a first low-power mode, initiating a first phase;
   in response to determining that a first cache probe has been received at the first data processor device during the first phase, transitioning the first data processor device from the first low-power mode to a first active mode;
   in response to determining an end of the first phase, flushing a first cache associated with the first data processor device;
   wherein initiating the first phase comprises resetting a first timer associated with the first data processor device, and wherein determining the end of the first phase comprises determining a value stored at the first timer matches a first threshold;
   in response to receiving one or more cache probes during the first phase, adjusting the value stored at the first timer while the one or more cache probes are being serviced; and
   maintaining the value stored the first timer during the first phase while the one or more cache probes are not being serviced.

2. The method of claim 1, further comprising:
   in response to determining an end of the first phase, transitioning the first data processor device to a second low-power mode.

3. The method of claim 2, further comprising:
   providing a first clock signal having a first frequency when the first data processor device is in the first low-power mode; and
   providing the first clock signal having a second frequency when the first data processor device is in the second low-power mode.

4. The method of claim 2, further comprising:
   initiating a second phase in response to flushing the first cache; and
   in response to receiving a second cache probe has been received during the second phase, providing a response to the second cache probe while maintaining the first data processor device in the second low-power mode.

5. The method of claim 1, further comprising:
in response to determining the first cache probe has been received during the first phase, servicing the first cache probe; and
transitioning the first data processor device to the first low-power mode in response to servicing the first cache probe.

6. The method of claim 1, wherein the first threshold is programmable.

7. The method of claim 1, wherein a duration of the first phase is programmable.

8. The method of claim 1, further comprising:
initiating a second phase in response to determining that no cache probe has been received during the first phase; and
in response to receiving a second cache probe during the second phase, communicating an indication of a cache probe miss.

9. The method of claim 1, further comprising:
in response to determining a second data processor device has entered a second low-power mode, initiating a second phase;
in response to determining that a second cache probe has been received during the second phase, transitioning the second data processor device from the second low-power mode to a second active mode; and
in response to determining an end of the second phase, flushing a second cache associated with the second data processor device.

10. The method of claim 1, wherein the first cache comprises a first cache line, and wherein flushing the first cache comprises:
in response to determining a coherency state of the first cache line is a first state, copying data stored at the first cache line to a memory; and
setting the coherency state of the first cache line to an invalid state.

11. A method, comprising:
receiving a first request for a first data processor device to transition to one of a plurality of low-power modes;
in response to the first request, initiating adjustment of a first value stored at a first counter;
in response to the first value matching a first threshold, flushing a first cache associated with the first data processor device;
receiving one or more cache probes at the first data processor device after transitioning to the one of the plurality of low-power modes;
in response to receiving the one or more cache probes, initiating said adjustment of the first value stored at the first counter while the one or more cache probes are being serviced; and
maintaining the first value stored the first counter while the one or more cache probes are not being serviced.

12. The method of claim 11, further comprising:
in response to the first request, transitioning the first data processor device from an active mode to a first low-power mode of the plurality of low-power modes; and
in response to the first value matching the first threshold, transitioning the first data processor device to a second low-power mode of the plurality of low-power modes.

13. The method of claim 11, further comprising:
in response to receiving a first cache probe after initiating adjustment of the first value and prior to flushing the first cache, servicing the first cache probe; and
in response to receiving a second cache probe after flushing the first cache, communicating an indication of a cache probe miss.

14. A device comprising:
a first processor;
a first cache coupled to the first processor;
a counter configured to store a first value; and
a control module coupled to the counter and the first cache, the control module configured to initiate periodic adjustment of the first value in response to a request to transition the first processor from an active mode to one of a plurality of low-power modes and configured to flush the first cache in response to the first value matching a threshold value;
receive one or more cache probes at the first processor after transitioning to the one of the plurality of low-power modes;
initiate said periodic adjustment of the first value stored at the counter while the one or more cache probes are being serviced; and
maintain the first value stored the counter while the one or more cache probes are not being serviced.

15. The device of claim 14, wherein the plurality of low-power modes comprises a first low-power mode and a second low-power mode, and further comprising:
a power control module coupled to the first processor and the control module, the power control module configured to transition the first processor from the active mode to the first low-power mode in response to the request to transition the first processor, and configured to transition the first processor to the second low-power mode in response to the control module flushing the first cache.

16. The device of claim 14, wherein the first processor is configured to service a first cache probe in response to receiving the first cache probe when the first processor is in the one of the plurality of low-power modes and before the first value matches the threshold value.

17. The device of claim 14, wherein the threshold value is a programmable value.

* * * * *